United States Patent
Boleyn et al.

(10) Patent No.: US 6,502,084 B1
(45) Date of Patent: Dec. 31, 2002

(54) METHOD OF ELECTRONIC KNOWLEDGE EXTRACTION, TRANSFER AND USE

(75) Inventors: Ira Boleyn, Highland Heights, KY (US); James S. Hoelle, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/337,934

(22) Filed: Jun. 22, 1999

(51) Int. Cl.⁷ .............................. G06F 15/18
(52) U.S. Cl. .................... 706/45; 706/46; 706/47; 706/48
(58) Field of Search ............... 717/1; 706/60, 706/48, 59, 45, 11, 47, 46; 707/3

(56) References Cited

U.S. PATENT DOCUMENTS

| | | | |
|---|---|---|---|
| 4,783,752 A | 11/1988 | Kaplan et al. | 706/48 |
| 4,891,766 A | 1/1990 | Derr et al. | 706/60 |
| 4,939,668 A | 7/1990 | Brown et al. | 706/59 |
| 5,402,524 A | 3/1995 | Bauman et al. | 706/45 |
| 5,412,756 A | 5/1995 | Bauman et al. | 706/45 |
| 5,418,888 A | 5/1995 | Alden | 706/48 |
| 5,450,545 A | 9/1995 | Martin et al. | 717/109 |
| 5,488,714 A * | 1/1996 | Skidmore | 717/143 |
| 5,537,590 A | 7/1996 | Amado | 707/2 |
| 5,574,828 A | 11/1996 | Hayward et al. | 706/45 |
| 5,701,400 A | 12/1997 | Amado | 706/45 |
| 5,793,933 A * | 8/1998 | Iwamasa | 706/45 |
| 5,899,985 A * | 5/1999 | Tanaka | 706/45 |
| 5,940,817 A | 8/1999 | Kishi et al. | 706/45 |

OTHER PUBLICATIONS

Learning to Extract Symbolic Knowledge from the World Wide3 Wed, Mark Craven; Dayne Freitag; Andrew McCallum; Tom Mitchell; Kamal Nigam; Choon Yang Quek; (1998) Proceeding of AAAI–98, Conf. of American Artificial Intelligence, pps. 1–17.

Learning Information Extraction Rules for Semi–structured and Free Text, Stephen Soderland; (1999) Machine Learning, pps. 1–44.

Relational Learning of Pattern–Match Rules for Information Extraction, Mary Elaine Califf and Raymond J. Mooney (1997) AAAI Spring Symposium on Applying Machine Learning to Discourse Preocessing, pps. 1–6.

* cited by examiner

*Primary Examiner*—Thomas Black
*Assistant Examiner*—Michael B. Holmes
(74) *Attorney, Agent, or Firm*—William Scott Andes; Cantor Colburn LLP

(57) ABSTRACT

An exemplary embodiment of the invention is directed to a method for knowledge extraction, transfer and use of stored data, wherein data files in a computer system are checked. The method includes: providing a knowledge base for a data file type, the data file being of the data file type; applying the knowledge base to the data file; and; providing output data indicative of a result of the applying the knowledge base to the data file. This output data may then be printed or otherwise displayed. The computer system may also automatically correct the data file based on this output data.

20 Claims, 2 Drawing Sheets

METHOD OF ELECTRONIC KNOWLEDGE EXTRACTION, TRANSFER AND USE

BACKGROUND OF THE INVENTION

The invention relates generally to a method of processing stored data, e.g., text type data, and, more particularly, to a method of knowledge extraction, transfer and use of such stored data.

When generating documents and drawings repeatedly that are directed to a common subject, such as for example an engineering drawing. Certain types of errors commonly reoccur. Checklists have been used to detect reoccurring errors in many applications, such as in engineering drawings. These checklists are workable when they are kept to a reasonable length, whereby only the most common reoccurring errors are detected by use of such a checklist. However, many types of errors do not occur often enough to be included in the checklist, whereby such errors are often missed.

Such errors include, but are not limited to, the result of an improper entry into the computer system, i.e., human error. It would be advantageous to utilize the processing power of the computer to analyze and provide correction for such errors, particularly in such electronically stored documents and drawings that are of the type that are repeatedly generated.

BRIEF SUMMARY OF THE INVENTION

In an exemplary embodiment of the invention a method of knowledge extraction, transfer and use of stored data is provided. With electronic data files, e.g., documents and drawings, the items in the documents and on the drawings are associative and dependent. More specifically, there are groups of items that are always seen together, and these groups are dependent on the document or drawing type. Using known computer program techniques, such as are available with, e.g., "per15" programming language, it is possible to extract knowledge (rules) from groups of documents or drawings and apply the extracted rules to a new document or drawing without the need to reprogram. In an exemplary embodiment of the invention, a method (program) of checking a data file in a computer system comprises: providing a knowledge base (similar correct files) for a data file type, the data file (being checked) being of the data file type; applying the knowledge base to the data file; and; providing output data indicative of a result of the applying the knowledge base to the data file.

The program can learn what is correct, from groups of similar documents or drawings and apply that knowledge to new documents or drawings. The Program can also tailor or target, tests and outputs without a programmer. In addition to such rules extraction and use, the program can be made to be robust, portable, user friendly, versatile and may be used as a stand alone or embedded in another program.

DETAILED DESCRIPTION OF THE INVENTION

Figure 1:
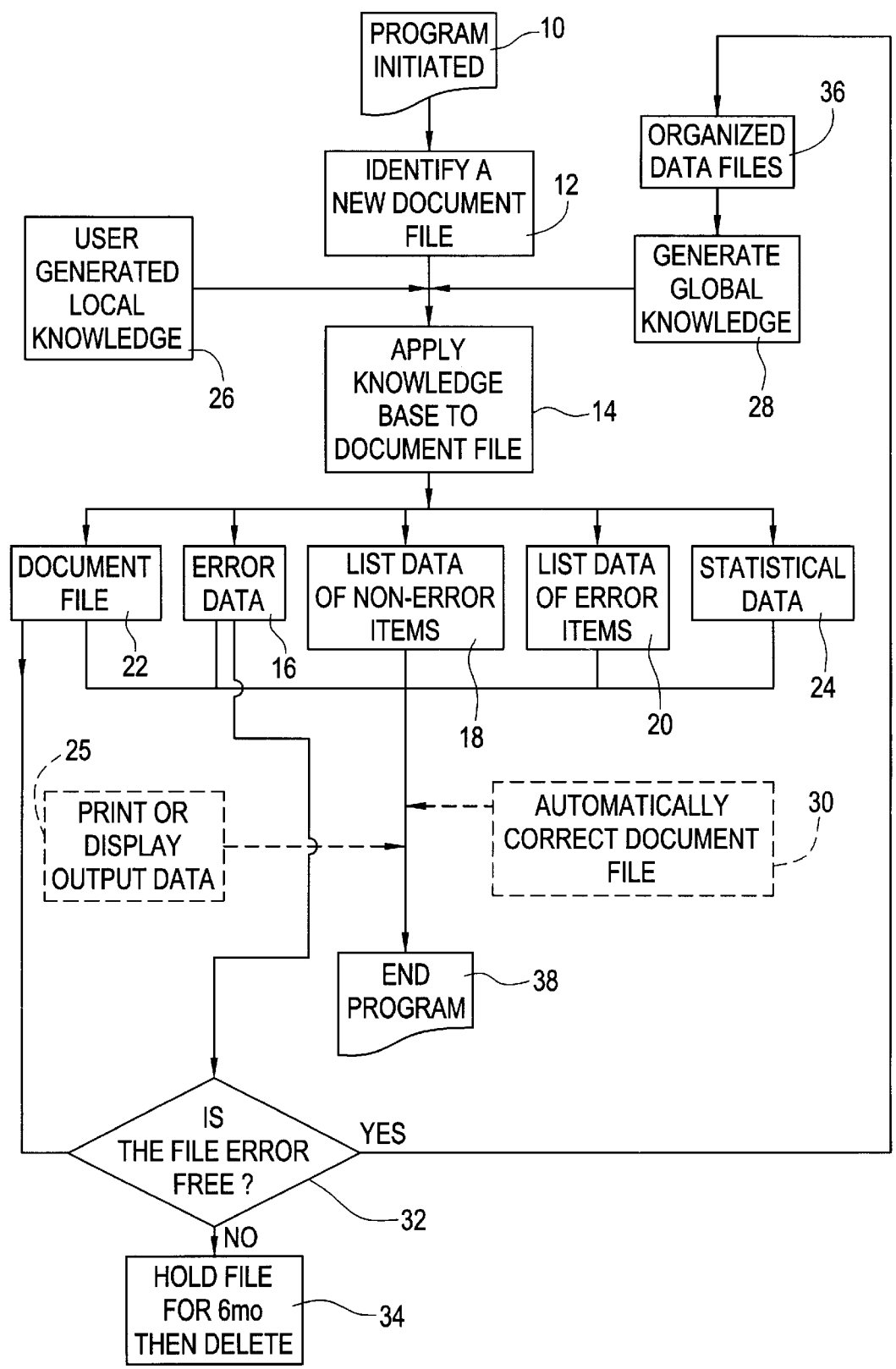
FIG. 1 is a flowchart of a method for knowledge extraction, transfer and use of stored data in an exemplary embodiment of the invention.

Referring to FIG. 1, a flow diagram of a program for knowledge extraction, transfer and use of stored data is generally shown. The program is initiated at block 10 and then proceeds to block 12 where a user identifies, e.g., a document file to be checked. The document file identified contains all of the data to which a knowledge base will be applied. Although this exemplary embodiment describes the data file as a document file, it is within the scope of the present invention that such data file comprise a drawing file or any other such data file.

The knowledge base is applied to the file at block 14 to generate a list of concerns (errors), a checklist, and a list of items that checked correctly. There are eight files involved in this checking process. These are the file to be checked, two knowledge files ('gtestlin' which contains global rules and 'ltestline' which contains local rules), and five output files ('error.txt' which contains error data 16; check.txt' which contains a data list 18 of the items that were checked and were ok t+c+, or t−c−, 'checklist.txt' which contains a data list 20 of the items that were errors or had warnings issued or there was a concern when the test was ok, an output file (which is the file being check) 22 and statistical data file 24). The output data may then be printed or otherwise displayed (block 25), such being well known in computer systems. The output data may also be used to optionally automatically correct the document file (block 30). Local knowledge is generated (block 26) by the user and may be altered by the user at any time. Global knowledge is generated (block 28) by the program. The global knowledge is not accessible to all users and may be changed only by the program and designated users. A query is made at block 32 to determine if the document file was error free. If document file was not error free then hold the document for a period of time, e.g., 6 months, then delete the file (block 34). If the document file was error free then include in organized data files at block 36, to be utilized in generating global knowledge (block 28). The program is terminated (or ends) a block 38.

A 'test' is a comparisons of lines in a target file (i.e., the file to be checked) to a test value ($filter). A test result is positive for t+d + or t−d− and negative for t+d− or t−d+, wherein "t" values represent what is in the file and "d" values represent what is desired. "t+" means that the value is present in the target file. "t−" means that the value is not present in the target file. "d+" means that the desired value should be present in the target file. "d−" means that the desired value should not be present in the target file.

Figure 2:
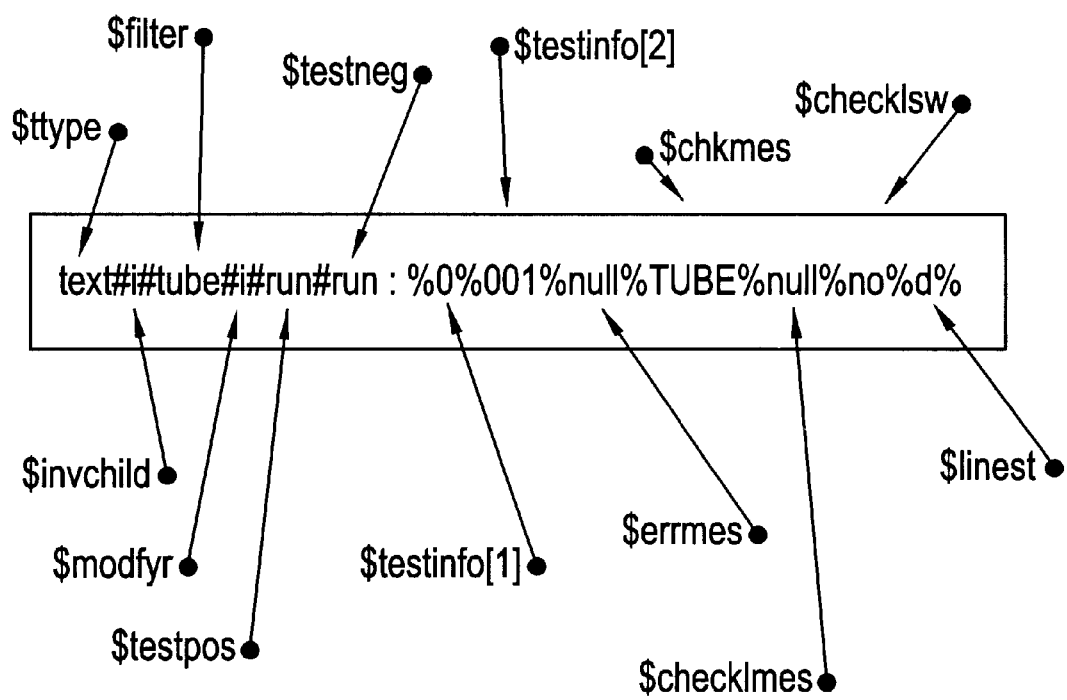
FIG. 2 is a text string (rule) that defines the values, dependencies and actions for a check in an exemplary embodiment of the invention.

The local knowledge (array @ltest local rules data) is added to the global knowledge (array @gltest global rules data). The total knowledge is copied to an array (@test target lines). The temporary storage is examined. Knowledge rules marked as deleted and blank lines are removed. A 'rule' is a text string that defines the values, dependencies and actions for a check (a piece of intelligence). The program of the present invention utilizes known computer program techniques, e.g., the "per15" programming language. An exemplary line (FIG. 2) includes variables, such as, $ttype, $invchild, $filter, $modfyr, $testpos, $testneg, $testinfo[2], $errmes, $chkmes, $checklmes, $checklsw, $testinfo[1], and $linest.

$ttype is a test type second dimension array $tests[0] wherein:

'text' means test is text based, positive is presence of $filter value;

'var' means test is variable based, $filter contains array number for predefined value in @ extract;

'count' means test is based on a count of the number of lines containing the value in $filter; and 'sub' means execute an external program if the trigger conditions are met path and name of the routine are located in the $errormes variable.

$invchild is an invert child second dimension array @tests[1] wherein:

'i' means invert the run status of dependent tests, the check positive and check negative values of dependent test are inverted, and run becomes err and err becomes run (an 'action run' (run) means to continue; err (error) means the situation is an error, and errors are t+d− and t−d+), when used, dependent tests are now independent of the trigger value in $filter; and 'n' means do not invert dependent tests, when used this letter causes all dependent tests to be removed.

$filter is a filter value second dimension array $tests[2] wherein it is numeric for var test type and alphanumeric for all others. All "perl" programmning regular expression and values are valid in this test type, certain characters are prohibited, e.g., # and %.

$modfyer is a modifier second dimension array $tests[3] wherein:

'i' means ignore case, this modifier is used to ignore case on text comparisons; and 'n' means do not ignore case, an exact match is required $testpos is a test positive second dimension array $tests[4] wherein:

'run' means the desired outcome is positive; and

'err' means the desired outcome is negative.

$testneg is a test negative second dimension array $tests[5] wherein:

'run' means if the test is negative print no error message and continue; and

'err' means if the test outcome is negative then print an error message.

$testinfo[1] is a dependency second dimension array $tests[0] wherein 'number' means the number of tests that this test is dependent on, a "0" means no tests precede this one, etc.

$testinfo[2] is a sequence information second dimension array $tests[0] wherein a number 000–999 used internally for sequencing. $errmes is an error message seed, second dimension array $tests[0] wherein 'null' means do not print an error message, this applies even if the test returns a negative, all other result in the error message being printed if the test returns any negative t+d− or t−d+. A 'seed' is a text value that becomes part of an output message, the seed text is preceded by the line number of the rules file and the drawing number or the target file ID (identification). The text in this variable has text added to it by the program and is printed in the error file. This text also becomes the seed for the tally file line when an error is detected.

$chkmes is a check message seed second dimension array $tests[0] wherein 'null' means do not print a check message, all other values prints a check message if the test returns a positive t+d+ or t−d−. The text in this variable has text added to it by the program and is printed in the check file.

$checklmes is a checklist message seed second dimension array $tests[0] wherein the text in this variable becomes part of the checklist message. The text becomes part of the checklist whenever the $errmes value is not null and an error or warn is indicated, (t+d−, t−d+). The line value precedes the message and the check identifiers are appended to the message seed.

Checklist is a message switch second dimension array $tests[0] wherein the value in this variable determines whether a checklist message is printed when the test is positive and desired value is positive or the test is negative and the desired value is negative.

$linest is a line status wherein:

'd' means deleted line;

'm' means modified line; and

'n' means null, no modifications.

This value is set when a line is deleted or modified. The value is used by a teacher to alter new lines, when a change is made to the experiences database. The 'teacher' is a component of the program that extracts rules and values from the experience data base.

If a line (or as referred to herein a 'rule') applies, then that rule, and all dependent rules are applied. If the rule does not apply, then the rule, and all dependent rules are removed. Rules that don't apply and dependent rules are quickly removed. The rules are applied one by one until all of the rules have been applied. If a rule cannot be applied or is confusing, then the program removes that rule, prints it in the error file with a special message and continues.

The program extracts rules based on a directory structure. When the program is installed a directory structure is constructed. This structure is organized from root to file. The root directory contains one each of all of the files in the sub directories. The sub directories contain examples of files with a similar attribute. For example, the root directory might contain "automobiles". The next level of sub directories might contain groups organized by the country of origin of such automobiles. The next group in a sub directory would contain groups of automobiles made in that country by each manufacturer. The file that contains information on a particular manufacture would be present in all three levels. The rules extractor goes through the directories starting with automobiles. The program looks for commonality, and when it finds attributes that are common, it sets a rule and makes a record. At each successive level the program looks for more common points. When it finds them it subtracts the common items for the previous directories and sets the rules base to the remainder. The rules base is stored in a special file in that directory. The program uses the most often occurring common trait as the trigger for that dependency. A 'trigger' is a single test value that has several dependencies. A 'dependency' describes tests that are contingent on the results of a previous test.

The learning feature also incorporates the ability to recognize new groups of dependent items. The program takes the new example and compares it against the knowledge base. If the new example cannot be accounted for with the known rules and dependencies, then the program looks for a new dependency. If attributes can be found. Then the dependency is catalogued and stored, if not operator intervention is requested.

In addition to the above. The program can be fed a known incorrect document and it will determine what is not there, or what is there, that is not supposed to be there, and construct rules accordingly.

When the knowledge is extracted from the files the program looks at the existing knowledge. Rules that were added deleted or modified are carried over or deleted as necessary, the old rules are archived and then replaced by the new knowledge set.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of checking an input data file in a computer system, the method comprising:

providing a knowledge base for a data file type, said knowledge base including similar correct data files of said data file type and said input data file being of said data file type;

applying said knowledge base to the input data file; and providing output data indicative of a result of said applying said knowledge base to the input data file.

2. The method of claim 1 wherein said knowledge base further includes local knowledge and global knowledge.

3. The method of claim 2 wherein said providing said knowledge base comprises:

providing said local knowledge of said knowledge base from a user; and providing said global knowledge of said knowledge base from the computer system.

4. The method of claim 1 wherein said knowledge base further includes a plurality of rules.

5. The method of claim 4 wherein said providing said knowledge base comprises:

extracting said rules from said similar correct data files on a directory structure.

6. The method of claim 4 wherein said providing a knowledge base comprises:

learning said rules from users.

7. The method of claim 1 wherein the data file comprises a document data file or a drawing data file.

8. The method of claim 1 further comprising:

correcting the input data file based on said output data.

9. The method of claim 1 wherein said output data comprises error data, list data of non-error items, list data of error items, or statistical data.

10. The method of claim 1 further comprising:

generating a readable form of said output data.

11. The method of claim 10 wherein said generating said a readable form of said output data comprises printing or displaying said output data.

12. A storage medium encoded with machine-readable program code for checking an input data file in a computer system, said program code including instructions for causing the computer system to implement a method comprising:

providing a knowledge base for a data file type, said knowledge base including similar correct data files of said data file type and said input data file being of said data file type;

applying said knowledge base to the input data file; and providing output data indicative of a result of said applying said knowledge base to the input data file.

13. The storage medium of claim 12 wherein said knowledge base further includes local knowledge and global knowledge.

14. The storage medium of claim 13 wherein said providing a knowledge base comprises:

providing said local knowledge of said knowledge base from a user; and providing said global knowledge of said knowledge base from the computer system.

15. The storage medium of claim 12 wherein said knowledge base further includes a plurality of rules.

16. The storage medium of claim 15 wherein said providing a knowledge base comprises:

extracting said rules from said similar correct data files based on a directory structure.

17. The storage medium of claim 15 wherein said providing a knowledge base comprises:

learning said rules from users.

18. The storage medium of claim 12 wherein the input data file comprises a document data file or a drawing data file.

19. The storage medium of claim 12 wherein said method further comprises:

correcting the input data file based on said output data.

20. The storage medium of claim 12 wherein said output data comprises error data, list of non-error items, list data of error items, or statistical data.

* * * * *